`US012462397B2`

United States Patent
Herbon

(10) Patent No.: US 12,462,397 B2
(45) Date of Patent: Nov. 4, 2025

(54) METHOD AND DEVICE FOR LINKING OPTICAL FLOW ACROSS A PLURALITY OF IMAGES OF AN IMAGE DETECTION DEVICE

(71) Applicant: Robert Bosch GmbH, Stuttgart (DE)

(72) Inventor: Christopher Herbon, Weil im Schoenbuch (DE)

(73) Assignee: ROBERT BOSCH GMBH, Stuttgart (DE)

(*) Notice: Subject to any disclaimer, the term of this patent is extended or adjusted under 35 U.S.C. 154(b) by 415 days.

(21) Appl. No.: 17/451,422

(22) Filed: Oct. 19, 2021

(65) Prior Publication Data
US 2022/0138962 A1   May 5, 2022

(30) Foreign Application Priority Data
Oct. 29, 2020   (DE) ................ 10 2020 213 587.8

(51) Int. Cl.
*G06T 7/20*   (2017.01)
*G06T 7/215*   (2017.01)

(52) U.S. Cl.
CPC .... *G06T 7/215* (2017.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 5,946,041 A | * | 8/1999 | Morita | H04N 19/54 348/420.1 |
| 7,778,466 B1 | * | 8/2010 | Medasani | G06V 10/507 382/199 |
| 2008/0247462 A1 | * | 10/2008 | Demos | H04N 19/63 375/240.03 |
| 2012/0020518 A1 | * | 1/2012 | Taguchi | G06T 7/292 382/103 |
| 2014/0153784 A1 | * | 6/2014 | Gandolph | G06T 7/269 382/107 |
| 2015/0169954 A1 | * | 6/2015 | Schlattmann | G06T 7/20 382/103 |
| 2020/0065615 A1 | * | 2/2020 | Fukaya | G06V 20/584 |
| 2021/0065379 A1 | * | 3/2021 | Zhang | G06V 10/82 |

FOREIGN PATENT DOCUMENTS

| | | |
|---|---|---|
| DE | 102017214614 A1 | 2/2019 |
| JP | 2013149177 A   * | 8/2013 |

* cited by examiner

*Primary Examiner* — Amandeep Saini
*Assistant Examiner* — Caroline Tabancay Duffy
(74) *Attorney, Agent, or Firm* — NORTON ROSE FULBRIGHT US LLP

(57) ABSTRACT

A method for linking optical flow across a plurality of images of an image detection device for a vehicle. At least one tile is selected from a track map, the track map including a plurality of flow tracks and being subdivided into a plurality of tiles. At least one flow track encompassed by the tile is subsequently extended, using a flow vector of a flow map that is associatable with the flow track. The flow map includes a plurality of flow vectors that are based on a present image of the plurality of images.

15 Claims, 10 Drawing Sheets

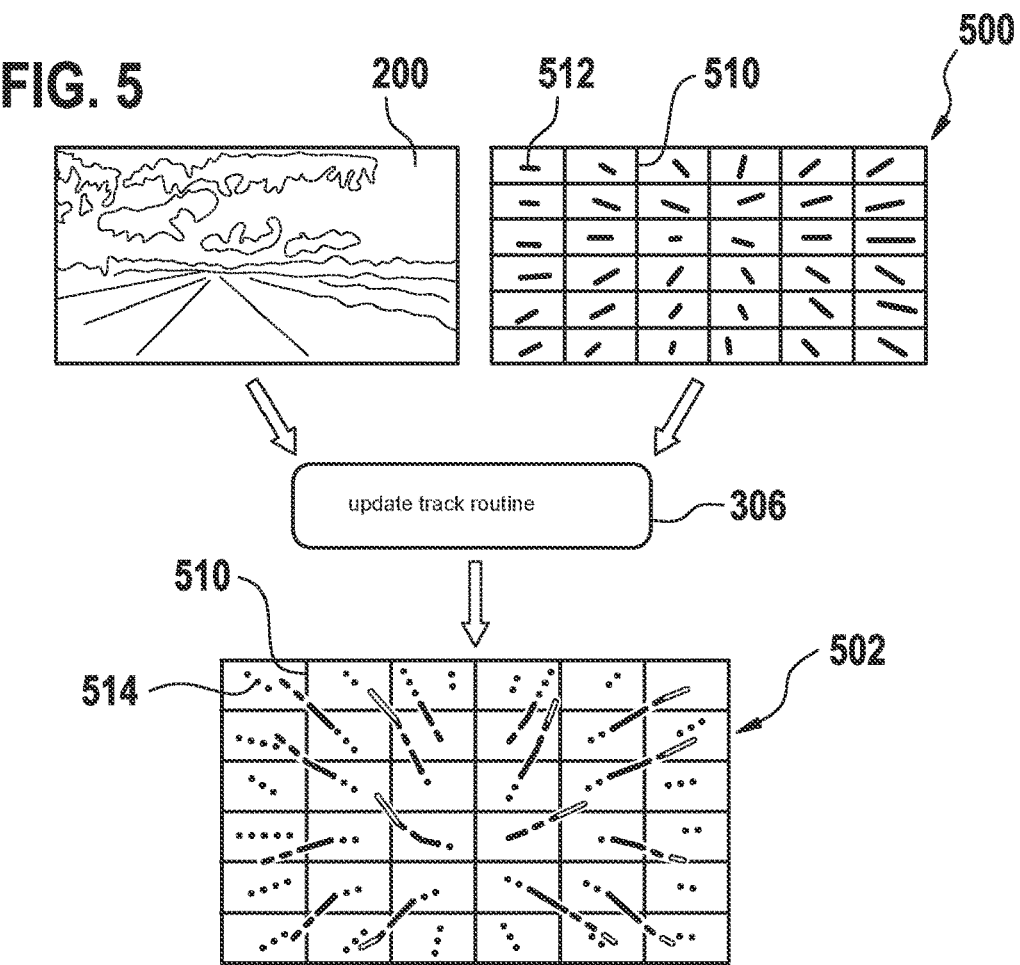
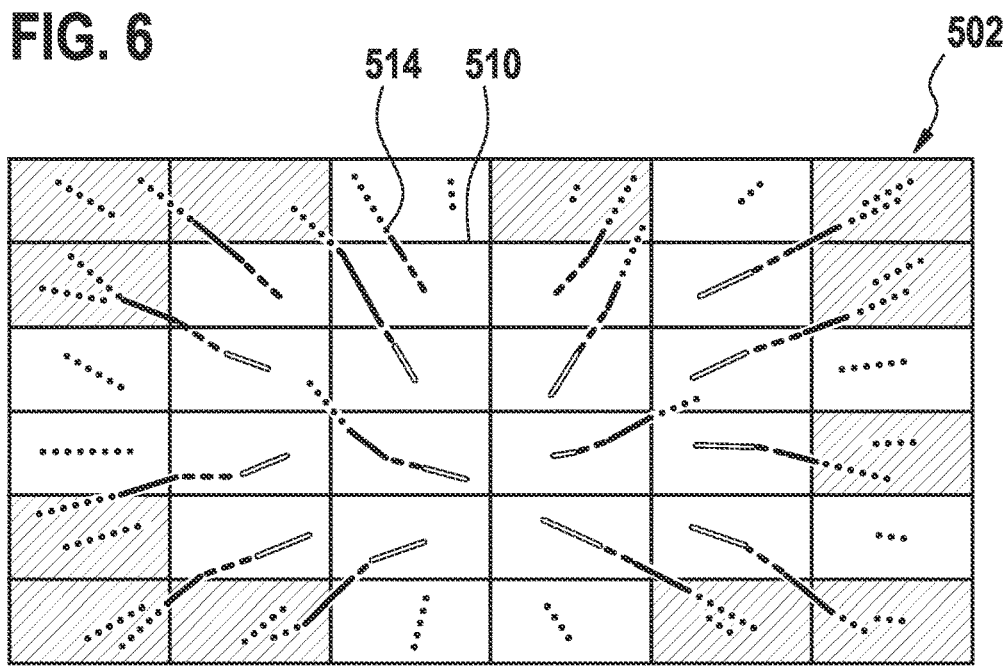

| null | null | null | null | null | null |
|---|---|---|---|---|---|
| null |  |  |  | null | null |
| null | 7/19 | 2/8 | 4/5/12 | null | null |
| null | null | 20/26 | 29/34 | 24/30 | null |
| null | null |  | null | null | null |
| null | null | null | null | null | null |

METHOD AND DEVICE FOR LINKING OPTICAL FLOW ACROSS A PLURALITY OF IMAGES OF AN IMAGE DETECTION DEVICE

CROSS REFERENCE

The present application claims the benefit under 35 U.S.C. § 119 of German Patent Application No. DE 102020213587.8 filed on Oct. 29, 2020, which is expressly incorporated herein by reference in its entirety.

FIELD

The present invention is directed to a device or a method for linking optical flow across a plurality of images of an image detection device for a vehicle. A further subject matter of the present invention relates to a computer program.

BACKGROUND INFORMATION

Movements in a sequence of images may be mapped via the optical flow.

German Patent Application No. DE 10 2017 214 614 A1 provides a method for the plausibility check of a flow vector hypothesis.

SUMMARY

Against this background, with the approach presented here a method for linking optical flow across a plurality of images of an image detection device, a device that uses this method, and a corresponding computer program are provided. Advantageous refinements and enhancements of the device are possible by use of the measures disclosed herein.

The approach in accordance with an example embodiment of the present invention allows a concatenation of flow vectors in order to determine an optical flow over an extended period of time.

In accordance with an example embodiment of the present invention, a method for linking optical flow across a plurality of images of an image detection device includes the following steps:
  selecting at least one tile from a track map, the track map including a plurality of flow tracks and being subdivided into a plurality of tiles; and
  extending at least one flow track encompassed by the tile, using a flow vector of a flow map that is associatable with the flow track. The flow map includes a plurality of flow vectors. The flow vectors are based on a present image of the images.

The image detection device may be a camera as used, for example, on a vehicle for surroundings detection. The image detection may record images and provide them via an interface. An offset of image points between two of the images may be described by the optical flow. The optical flow may be mapped by the flow map. A flow vector may be associated with each point of the flow map. A flow track may be formed by concatenating a flow vector of a first flow map with a flow vector of a subsequent second flow map when an end point of the flow vector of the first flow map may be associated with a starting point of the flow vector of the second flow map. Flow tracks formed in this way may be combined in the track map. A flow track may be defined by an initial point, an arbitrary number of intermediate points, and an end point. If a flow track is extended by a further flow vector, the previous end point of the flow track may represent a further intermediate point, and the end point of the further flow vector may represent a new end point of the flow track. The track map may be subdivided into individual regions, it being possible for each region to be associated with one tile. The track map may be updated continuously using present flow vectors. For example, the steps of selecting and of extending as well as optional further steps of the method may be repeated until all tiles of the track map are updated. According to one specific embodiment, the steps of the method may be carried out anew as soon as new flow vectors or a complete, new flow map are/is available.

In the step of extending, the flow track may be extended when an end point of the flow track is associatable with a starting point of the flow vector. For example, it may be checked whether a flow vector, whose starting point may be associated with the end point of the flow track to be updated, may be found in the present flow map. If this is the case, the existing flow track may be supplemented by the flow vector that is found. The end point of the found flow vector thus becomes the new end point of the extended flow track. In this way, existing flow tracks may be extended easily and, in principle, as often as desired.

If no flow vector, whose starting point may be associated with the end point of the flow track to be updated, is found in the present flow map, the existing flow track may be denoted as inactive, invalid, or inapplicable, for example by marking the flow track with a corresponding validity attribute. In this way, flow tracks that are no longer to be continued may be sorted out.

In accordance with an example embodiment of the present invention, the method may include a step of starting a new flow track, using a flow vector of the flow map. This step may be carried out when the tile includes no flow track with which a flow vector of the flow map is associatable. This may be the case, for example, when the tile includes no flow track, or in fact includes at least one flow track, but no associatable flow vector is found. A decrease in the number of flow tracks may be advantageously counteracted in this way.

In the step of starting, the new flow track may be started using a starting point in the tile, i.e., the tile to be updated at that moment. This may be the case when an enabling signal indicates an enablement of the tile for starting new flow tracks. In this way, flow tracks may advantageously be preferentially started in regions that provide an added value, for example for downstream evaluation systems. According to one specific embodiment, the new flow track may likewise be started in this tile when an object signal indicates a mapping of a relevant object in an image detail of the present image associated with the tile. The tracking of relevant objects using the flow map is thus facilitated. For example, if the present tile is not enabled for a start of a new flow track, the step of starting may be skipped, or some other tile in which the new flow track may be started may be selected.

After the step of extending, a step of sorting out may follow in which either the flow track or a further flow track is sorted out from the track map. The sorting out may take place, for example, when the end point of the flow track is occupied after the extension from an end point of the further flow track. An intersection or fusion of flow tracks may thus be avoided.

In the step of sorting out, the flow track or the further flow track may be selected for sorting out, based on a comparison between a quality criterion of the flow track and a quality criterion of the further flow track. Thus, the particular one of the flow tracks whose quality criterion is regarded as less relevant may be sorted out. For example, the length of the flow track in pixels, the number of segments of the flow tracks, the magnitude of the quantization error of the flow tracks, or the origin of the flow tracks may be used as a quality criterion. A uniform distribution of the end points of the flow tracks encompassed by the track map may be advantageously achieved in this way.

The step of sorting out may be carried out as a function of a situation signal or may be skipped. In this way, flow tracks may be advantageously sorted out based on the situation, or just retained. For example, using the situation signal, certain areas in the image may be excluded from the sorting out, or sorting out may be dispensed with in order to reduce computing time for certain recording situations of the images.

In a step of restarting, an additional flow track may be started when the flow track, i.e., the flow track that is extended in the step of extending, fulfills a restart criterion after the extension. For example, the number of segments of the flow track, a length of the flow track, i.e., a distance between an initial point and an end point of the flow track, or an acceleration of the flow track may be used as the restart criterion. A thinning out of individual regions, which may occur, for example, when many of the flow tracks are far away from their initial points, may thus be counteracted.

In the step of extending, an end point of the flow track prior to the extension may be retained as an intermediate point of the flow track. Subsequent retracing of a movement, for example of an object or object section, mapped by the flow track is thus possible.

In the step of extending, a validity attribute of the flow track that indicates a validity of the flow track may be set. A flow track may thus be marked as active or valid, for example, when it can be continued. Otherwise, the flow track may be marked as inactive when it can no longer be continued.

A quantization error of the flow track may be updated in the step of extending. A quantization error may occur when a flow track ends on a noninteger image point, so that when the flow track is extended, rounding up to the next integer image point must take place. The quantization error may thus indicate a deviation between a quantified end point of the flow track used for the step of extending and an actual end point. By associating a magnitude of the quantization error with the flow track in the step of extending, the quantization error may be taken into account, for example, during a subsequent renewed extension of the flow track or during use of the track map.

Thus, in the step of extending, the end point of the flow track after the extension may be corrected, for example, by a quantization error associated with the flow track. For example, during the extension of flow vectors, the quantization error may be subtracted from the last end point of the track. It may thus be ensured that the quantization error does not accumulate over an extended period of time in only the positive direction or only the negative direction.

In accordance with an example embodiment of the present invention, the method may include a step of reading in the flow map, using the flow vectors based on the present image of the plurality of images. In response to the reading in, at least the steps of selecting and extending may be carried out for at least one, multiple, or all tiles of the track map. The step of reading in and the subsequent steps may be repeated, for example as soon as a new flow map is available thereafter. The track map may be continuously updated in this way.

The steps of the method may advantageously be carried out in real time. The track map may thus advantageously be available, updated in real time.

The method may include a step of detecting at least the present image of the plurality of images, using the image detection device. For this purpose, the method may include a step of forming the flow map, using the present image. Known methods may be relied on in order to form the flow map. The images provided by the image detection device may advantageously be processed immediately, also in real time, in order to update the track map.

This method may be implemented, for example, in software or hardware or in a mixed form made up of software and hardware, for example in a control unit.

Moreover, in accordance with an example embodiment of the present invention, the approach presented here provides a device that is designed to carry out, control, or implement the steps of one variant of a method provided here in appropriate units. By use of this embodiment variant of the present invention in the form of a device, the object underlying the present invention may also be achieved quickly and efficiently.

For this purpose, the device may include at least one processing unit for processing signals or data, at least one memory unit for storing signals or data, and at least one interface to a sensor or an actuator for reading in sensor signals from the sensor or for outputting data signals or control signals to the actuator and/or at least one communication interface for reading in or outputting data that are embedded in a communication protocol. The processing unit may be, for example, a signal processor, a microcontroller, or the like, it being possible for the memory unit to be a flash memory, an EEPROM, or a magnetic memory unit. The communication interface may be designed for reading in or outputting data wirelessly and/or in a hard-wired manner, it being possible for a communication interface to read in or output the hard-wired data electrically or optically, for example, from a corresponding data transmission line or output these data into a corresponding data transmission line.

In the present context, a device may be understood to mean an electrical device that processes sensor signals and outputs control and/or data signals as a function thereof. The device may include an interface that may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present on a microcontroller in addition to other software modules.

Also advantageous is a computer program product or computer program including program code that may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

Exemplary embodiments of the present inventio are illustrated in the figures and explained in greater detail in the following description.

BRIEF DESCRIPTION OF THE DRAWINGS

FIG. 5 shows a flowchart of a method for updating a flow track map according to one exemplary embodiment of the present invention.

FIG. 6 shows an updated track map according to one exemplary embodiment of the present invention.

DETAILED DESCRIPTION OF EXAMPLE EMBODIMENTS

Figure 1:
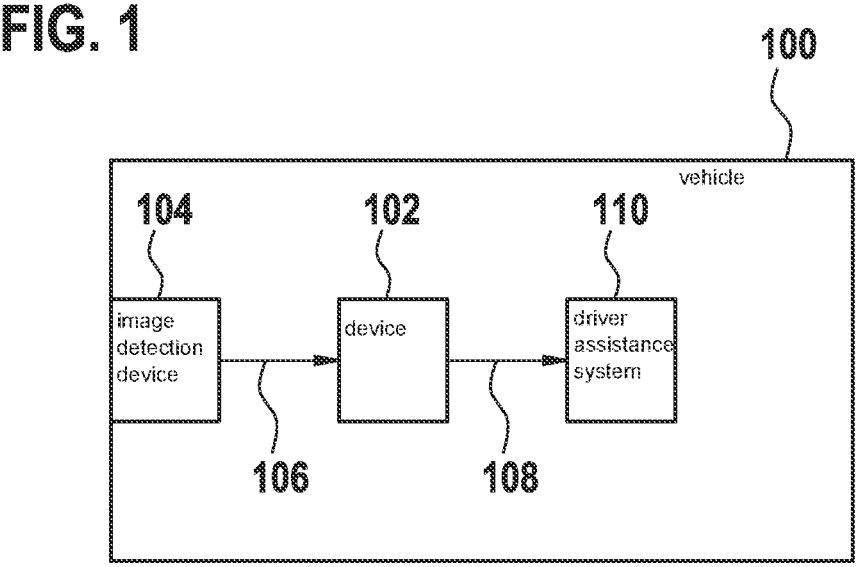
FIG. 1 shows a schematic illustration of a vehicle that includes a device for linking optical flow according to one exemplary embodiment of the present invention.

In the following description of advantageous exemplary embodiments of the present invention, identical or similar reference numerals are used for the elements having a similar action which are illustrated in the various figures, and a repeated description of these elements is dispensed with.

FIG. 1 shows a schematic illustration of a vehicle 100 that includes a device 102 for linking optical flow according to one exemplary embodiment. Vehicle 100 is a passenger automobile, for example. The application of the approach described here in conjunction with vehicle 100 is selected solely as an example. The described approach may also be used in conjunction with surveillance cameras, robotics, or medicine, for example.

Vehicle 100 includes an image detection device 104 which, for example, detects the surroundings of vehicle 100, in the present case an area ahead of vehicle 100 by way of example. Image detection device 104 includes one or multiple cameras, for example. For example, image detection device 104 represents a front video camera for vehicle 100.

Images 106 detected by image detection device 104 are used by device 102 to determine a track map 108 and to provide it in a continuously updated form. Images 106 are therefore also referred to as input images. As an example, track map 108 is used by a driving assistance system 110 of vehicle 100 in order to control a driving assistance function. According to one exemplary embodiment, track map 108 maps the optical flow of images 106 detected by image detection device 104 over an extended period of time.

The optical flow describes the offset of image points between two of images 106. Image points of images 106 are also referred to below as pixels. Images 106 may originate from a video sequence or from two different cameras of image detection device 104 in a temporally offset manner. The temporal or spatial distance of images 106 has a great influence on the result of the optical flow. The smaller the distance of images 106, the better the optical flow may be computed.

Optical flow may exist in different characteristic forms. A dense optical flow computes or interpolates a flow vector for each pixel of images 106. Quasi-dense optical flow may provide a flow vector, which may also be invalid, for each pixel. When optical flow is represented as a flow map, each pixel may, but does not have to, be described by a flow vector. Conventional methods may be relied on as an algorithm for creating a corresponding flow map. A sparse optical flow represents optical flow in the form of a list including a few, generally several hundred to several thousand, flow vectors. The optical flow, as shown in subsequent FIG. 2, for example, is a function of time intervals between images 106. Typical time intervals between successive images are 132 ms, 264 ms, or 528 ms, for example.

A dense or quasi-dense optical flow generates its result in the form of a flow map, which generally has the same resolution as the input images, for example images 106, or which is lower by a power of two, for example one flow vector for four pixels. This representation provides the user with the freedom to ascertain the movement at an arbitrary location of one of images 106 without having to go through all flow vectors. In contrast, the result of a sparse optical flow is present as a flow list in which the starting point and end point for each entry are provided without the entries having to have a defined order. Only flow maps are considered within the scope of the approach presented here.

The optical flow is used for numerous applications. In the automotive field, the optical flow is used in video cameras, for example in image detection device 104, to describe the movement of the mapped setting. Various pieces of information may be subsequently determined from the optical flow. Examples include the proper motion of vehicle 100 (visual odometry), the movement of objects in the setting (vehicles, pedestrians, road signs, etc.), the depth of the setting (structure from motion), blindness, for example a lack of movement in the setting of the camera, for example of image detection device 104, or a location of vehicle 100 in the world.

All these applications are also used outside the automotive field, for example in robotics, space travel, medicine, and many other fields. The embodiments described below refer primarily to automotive applications, but are transferable without limitation.

Figure 2:
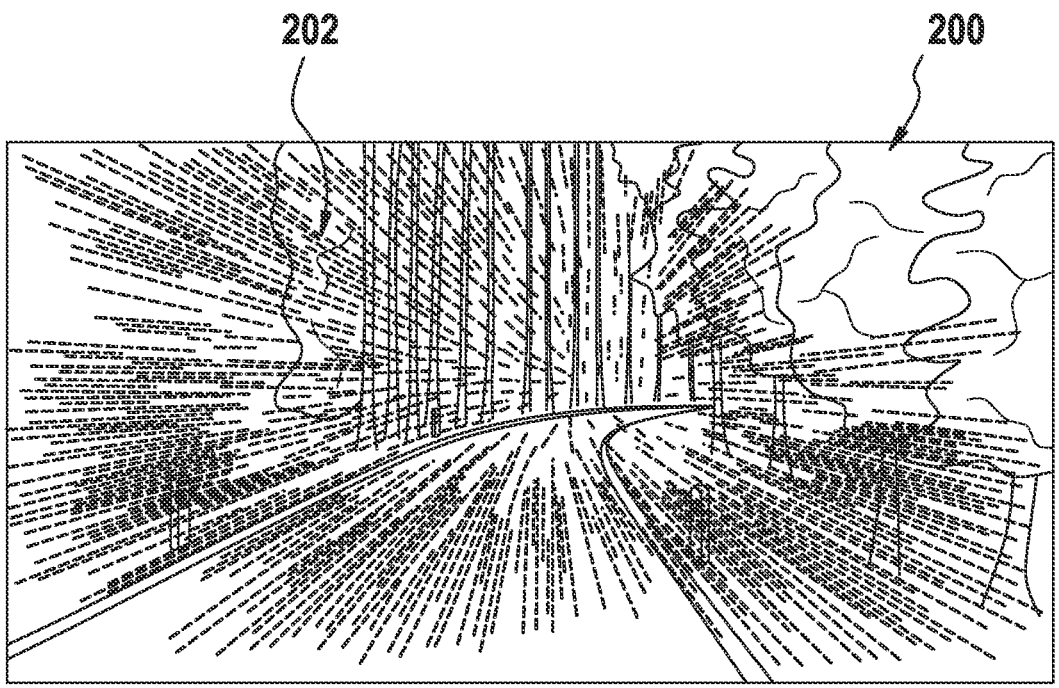
FIG. 2 shows a graphical illustration of a sparse optical flow according to one exemplary embodiment of the present invention.

FIG. 2 shows one possible graphical illustration of a flow map 200. Flow map 200 represents a sparse optical flow. Flow map 200 includes a plurality of flow vectors 202. The color or configuration of each of flow vectors 202 encodes its direction, and the saturation encodes its length. The number of flow vectors 202, also referred to as just vectors, decreases with a greater temporal distance between the images.

The shorter the temporal or spatial distance between the input image pair of the optical flow, the more accurate is the determination of the pixel movement, represented by flow vectors 202, and the greater is the availability, i.e., the number of flow vectors 202 of the optical flow. For algorithms for determining the optical flow, it is thus advantageous for the distance between the input images of the optical flow to be as small as possible.

The converse is also true: the greater the distance between the input images, the fewer flow vectors 202 that may be ascertained, and the more inaccurate is their result. Due to the geometric distortion of the setting, image points may be associated more poorly, and the inaccuracy increases.

From the standpoint of algorithms that utilize the result of the optical flow, a long time interval and thus a large flow vector length are usually advantageous. The reason is that the movement that is described via a flow vector is prone to error. The longer the flow vector itself, the smaller is the relative error of the flow vector. As an example, FIG. 2 shows the optical flow on images having a time interval of 264 ms. For a shorter time interval between the images, more but shorter flow vectors would be present, and for a longer time interval between the images, fewer but longer flow vectors would be present.

The described approach relates to a method for concatenating flow maps, such as flow map 200 shown, across multiple images. The movement between the original image and each subsequent image is described for each starting point. Not only the movement between the start image and the end image, but also the particular individual movement is ascertained. The result of the concatenated flow vectors is referred to as a flow track. This requires a dense or quasi-dense optical flow between neighboring image pairs.

The advantage of the described approach is that the optical flow may be determined over an arbitrarily long period of time using an arbitrary number of supporting points (intermediate images) without the geometric change in the image setting limiting the accuracy and the availability of the optical flow.

The described approach allows, apart from dedicated hardware such as FPGA or ASIC, in particular real time-capable computation in software. A uniform distribution of the end points of the flow tracks is optionally achievable. The described approach may be used in particular for proper motion estimation, object recognition, and object tracking on integrated image processing systems.

Unlike the case for conventional tracking algorithms, the objective of the described approach is not, or not just, to track individual landmarks or objects. According to one exemplary embodiment, the objective is to generate the most homogeneously distributed optical flow possible over a very long spatial or temporal distance, which achieves the above-described properties with regard to availability and accuracy, for example. This is particularly important in two applications:

On the one hand, a proper motion estimation requires the most homogeneous distribution possible of the flow track end points in order to avoid singularities or degenerated flow vector configurations. Such a degenerated configuration is present, for example, when all flow vectors 202 are situated on a line, for example at the horizon, or when all flow vectors 202 have the same origin point. Within the scope of the presented invention, these types of configurations are avoided with the aid of the methods described below.

On the other hand, the optical flow may be utilized for depth reconstruction of the mapped setting (structure from motion). Either a movement of the camera over time or a recording by more than one camera is necessary for this purpose. However, as described above, if it is necessary only to keep the temporal or spatial distance between two recordings low, the selectivity of moving or nonmoving objects with respect to the background thus also decreases. For example, if a vehicle traveling on an expressway approaches the end of a traffic jam, it is necessary to cleanly separate the stationary vehicle at the end of the traffic jam from the background or the roadway. If this does not take place with sufficient accuracy, the vehicle may not be recognized as an obstacle, and a braking operation may not be initiated.

Due to the concatenation of flow vectors 202 over an extended period of time, regardless of the content of the setting, the selectivity of objects with respect to the background and thus also the accuracy of a depth reconstruction increase. For a recognition of generic objects, it is necessary to uniformly scan the setting, in contrast to the selection of certain features in the image that are used in conventional tracking algorithms.

Figure 3:
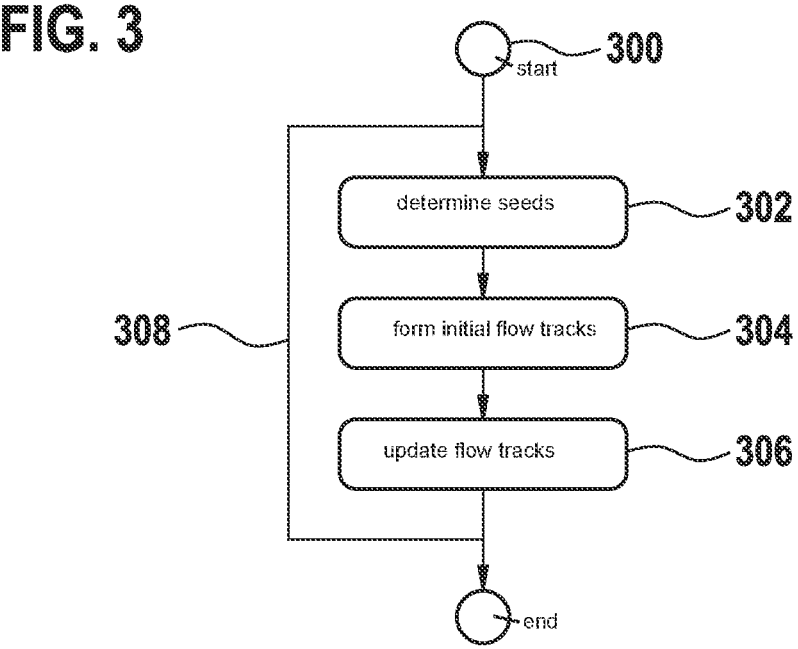
FIG. 3 shows a flowchart of a method for linking optical flow according to one exemplary embodiment of the present invention.

FIG. 3 shows a flowchart of a method for linking optical flow according to one exemplary embodiment. For example, an optical flow as illustrated in FIG. 2, i.e., the flow vectors illustrated in FIG. 2, may thus be supplemented by a further optical flow, for example generated using at least one subsequent image or generated from a subsequent image pair.

A start 300 of the method takes place when a first flow map is available. Such a flow map represents, for example, a list including flow vectors, as graphically illustrated in FIG. 2. For example, a flow map includes for each of the flow vectors a position of an initial point and a position of an end point. The first flow map may be generated, for example, as soon as a pair of images from which an optical flow may be determined is available.

According to one exemplary embodiment of the present invention, a main algorithm of the method is made up of three parts in the form of steps 302, 304, 306 of the schematic sequence illustrated in FIG. 3. The main logic system is present in a so-called update track routine represented by step 306, described in greater detail below based on one exemplary embodiment with reference to FIG. 4. Prior to the iterative updating of the flow tracks in step 306, a determination of seeds takes place in step 302, which are then further processed in step 304 to form initial flow tracks.

A repetition 308 of steps 302, 304, 306 takes place as soon as a new flow map is available, as indicated by a feedback loop 308. A new flow map may be generated as soon as a new image or a new image pair is available.

According to one exemplary embodiment, the individual flow tracks are combined in a track map.

Figure 4:
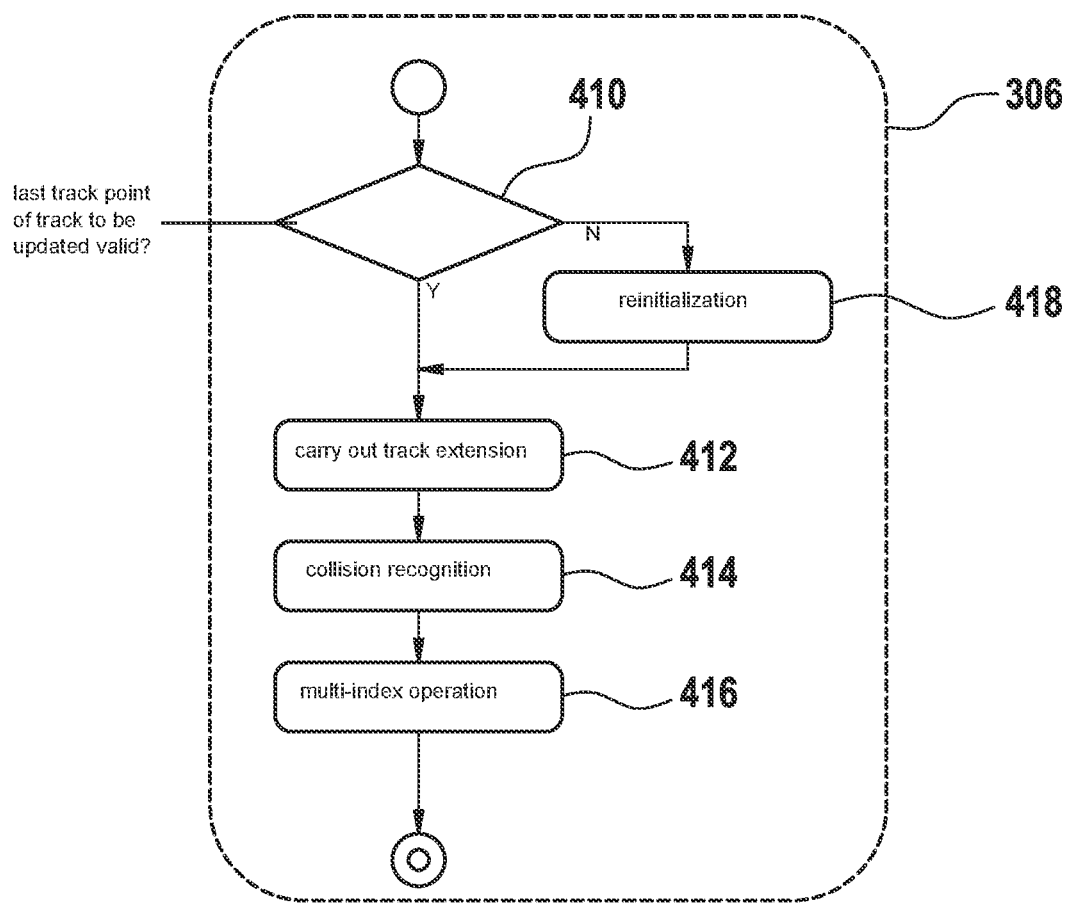
FIG. 4 shows a flowchart of one exemplary embodiment of a step of updating a flow track, in accordance with the present invention.

FIG. 4 shows a flowchart of one exemplary embodiment of step 306, shown in FIG. 3, of updating the flow tracks of a track map. Step 306 includes a plurality of steps 410, 412, 416, 418, some of which are optional, and which are carried out for each flow track. Each flow track of a track map may be updated in this way.

A check is made in step 410 as to whether the last track point of the track to be updated is valid. If this is the case, a track extension of the track to be updated is carried out in step 412. A collision recognition is subsequently carried out in optional step 414, and a multi-index operation is carried out in optional step 416.

If a result of step 410 shows that the last track point of the track to be updated is not valid, a reinitialization is carried out in step 418.

The described approach makes it possible to update the flow tracks in real time. All intermediate images do not have to already be present at the beginning. Instead, according to one exemplary embodiment the tracks are iteratively updated with the presence of new data, in particular without the data having to be sorted in a computation- and memory-intensive manner.

An approximately uniform distribution of the flow vectors over the image is optionally achieved without having to re-sort the flow vectors. According to exemplary embodiments, this takes place via two measures: on the one hand using an occupancy map for collision detection, and on the other hand using a multi-index concept.

According to one exemplary embodiment, the region in which the concatenated flow vectors begin is optionally limited in order to reduce the computing time.

The concatenated flow vectors make it possible to track the movement also across intermediate images, not just between a start image and an end image. This allows the selection of arbitrary time bases starting from the present image, but also starting from prior images.

According to one exemplary embodiment, the quantization error, which may possibly occur during the concatenation of the flow vectors, is reduced to a minimum.

The input-side flow maps may have a spatial offset. According to one exemplary embodiment, this offset is compensated for. This allows a resource-saving computation of the optical flow.

FIG. 5 shows a block diagram for updating a present track map 500 according to one exemplary embodiment. A step 306 of updating the flow tracks of track map 500 in order to obtain an updated track map 502 is illustrated. Present track map 500 is either an initial track map or a previous track map, depending on whether the method is being carried out for the first time or is being repeated.

Updated track map 502 is determined, using present track map 500 and a present flow map 200, by carrying out step 306. Present flow map 200 includes a plurality of flow vectors.

Present track maps 500, 502 are subdivided into a plurality of tiles 510, only one of which is provided with reference numerals in FIG. 5. Strictly by way of example, track maps 500 are subdivided into 36 tiles 510 arranged in six rows and six columns. According to the exemplary embodiment shown, all tiles 510 have the same size. Alternatively, at least some of tiles 510 have sizes that differ from one another. In addition, the arrangement of tiles 510 in columns and rows is selected strictly as an example.

Present track map 500 includes a plurality of flow tracks 512, only one of which is provided with reference numerals in FIG. 4. As an example, each of tiles 510 includes at least one flow track 512.

Updated track map 502 includes a plurality of updated flow tracks 514, only one of which is provided with reference numerals in FIG. 4. All or at least most of updated flow tracks 514 are made up of an extension of flow tracks 512 that are encompassed by present track map 500. Therefore, at least most of updated flow tracks 514 have a greater length than present flow tracks 512.

As soon as a new flow map is present, updated track map 502 may be regarded as a new present flow map and may be updated with the new flow map, as described with reference to shown flow map 200 and shown present track map 500. Step 306 may thus be carried out continuously in repetition in order to update the present track map that is present in each case.

According to one exemplary embodiment, flow map 200 and track maps 500, 502 are present as lists, regardless of the graphical illustration shown here and in the subsequent figures. For example, a list for each of updated flow tracks 514 that represents updated track map 502 includes values that define an initial point, an end point, and optionally at least one intermediate point that results from an extension.

The described approach allows a real time-capable linkage of optical flow. The updating in real time is described below based on one exemplary embodiment, with reference to FIG. 5.

For this purpose, FIG. 5 shows an update of flow tracks 512, using flow map 200 from the optical flow. A dedicated tile 510 in which the individual points of particular flow track 512 are stored is associated with each flow track 512. Each tile 510 contains M flow tracks, where generally M=2 . . . 3. For the sake of clarity, only one track per tile 510 is illustrated in each case in the figures. The size of a tile 510 is variable in principle. In practice, sizes of 6 pixels to 24 pixels per dimension have proven suitable. The height and width may, but do not have to, be the same. In the update routine illustrated by step 306, initially each tile 510 is considered individually. If a valid or active flow track 512 is present in tile 510 of present track map 500, this flow track 512 is extended. If no active flow track 512 is present, a new flow track is started, whose initial point is situated in tile 510 in which no active flow track 512 is present. The best starting point for the new flow track is selected, for example based on quality features that are present in flow map 200, for example.

Two cases may arise during the extension of one of flow tracks 512:

For the first case, the end point of present flow track 512 encounters a valid input in input-side flow map 200. Flow track 512 is extended, and the new data point is stored in a memory, for example.

For the second case, no valid flow vector is present in flow map 200 at the end point of flow track 512. In this case, either a neighboring flow vector from flow map 200 may be used, which results in a correspondingly greater error, or the end of flow track 512 is marked as invalid.

This procedure is repeated for all flow tracks 512 of present track map 500. In this way, an update of flow tracks 512 is carried out in an iteration step, based on the initial or previous track map 500 including concatenated flow vectors, which are referred to here as flow tracks 512.

If the extension of particular flow track 510 is successful, an optimization of updated track map 502 is carried out in further optional steps in order to achieve a uniform distribution. This takes place on the one hand via a collision detection, and on the other hand via a multi-index concept, as explained with reference to the subsequent figures.

FIG. 6 shows an updated track map 502 according to one exemplary embodiment. This is, for example, updated track map 502 described with reference to FIG. 5. Once again, for the sake of clarity, of the plurality of tiles only one tile 510 is provided with a reference numeral, and of the plurality of flow tracks 514, only one flow track 514 is provided with a reference numeral.

It is apparent from FIG. 6 that tiles 510 of flow track map 502 may be occupied by multiple flow track end points. An end point of a flow track 514 corresponds to the end point of the flow vector by which flow track 514 was most recently extended. Flow track 514 provided with a reference numeral is made up of three flow vectors by way of example.

The reason for the multiple occupancy of a tile 510 is that flow tracks 514 are stored in their starting tile and only virtually intersect the end points of flow tracks 514. However, this is an undesirable property for two reasons. On the one hand, the distribution of the flow track end points is no longer homogeneous, but instead is concentrated in certain locations of the image represented by flow track map 502. However, a uniform distribution is advantageous for a proper motion estimation.

On the other hand, certain camera orientations or travel directions may result in the flow track end points being contracted (compressed) at a location in the image. This is the case in particular when the so-called focus of compression (FOC) is situated within the image. The focus of compression (FOC), in a manner of speaking, is the same as the focus of expansion (FOE) in the opposite travel direction. This situation occurs, for example, when the travel direction is straight ahead and the camera points toward the rear, or when the travel direction is backwards and the camera points toward the front.

The multiple occupancy of tiles 510 of flow track map 502 by end points of flow tracks 514 is denoted in FIG. 6 by crosshatching of those tiles 510 in which multiple flow vectors end. For flow tracks 514 that are made up of multiple flow vectors, the last segment extends toward the edge of flow track map 502.

FIG. 6 schematically illustrates forward travel of a front camera in which flow tracks 514 move from the image center (focus of expansion) toward the edge, where they collide with shorter flow tracks 514.

Figure 7:
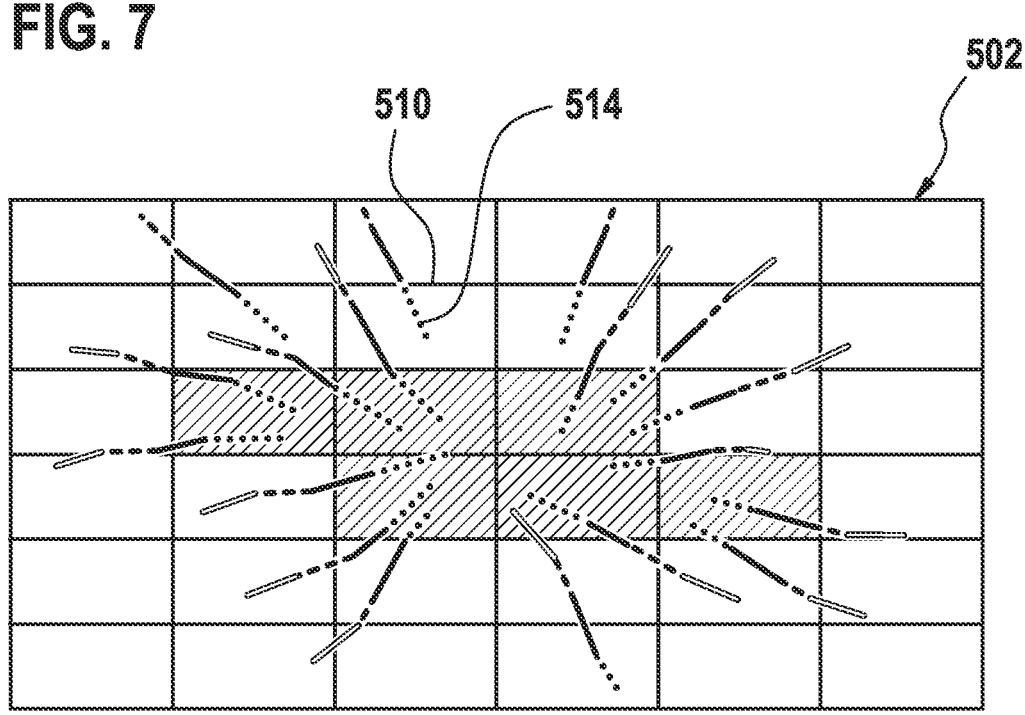
FIG. 7 shows an updated track map according to one exemplary embodiment of the present invention.

FIG. 7 shows an updated track map 502 according to one exemplary embodiment. In contrast to FIG. 6, backward travel of the front camera mentioned for FIG. 6 is schematically illustrated, in which flow tracks 514 in the middle of the image are compressed in a type of singularity. Only very few flow tracks 514 with a different origin remain, even when forward travel is resumed.

Figure 8:
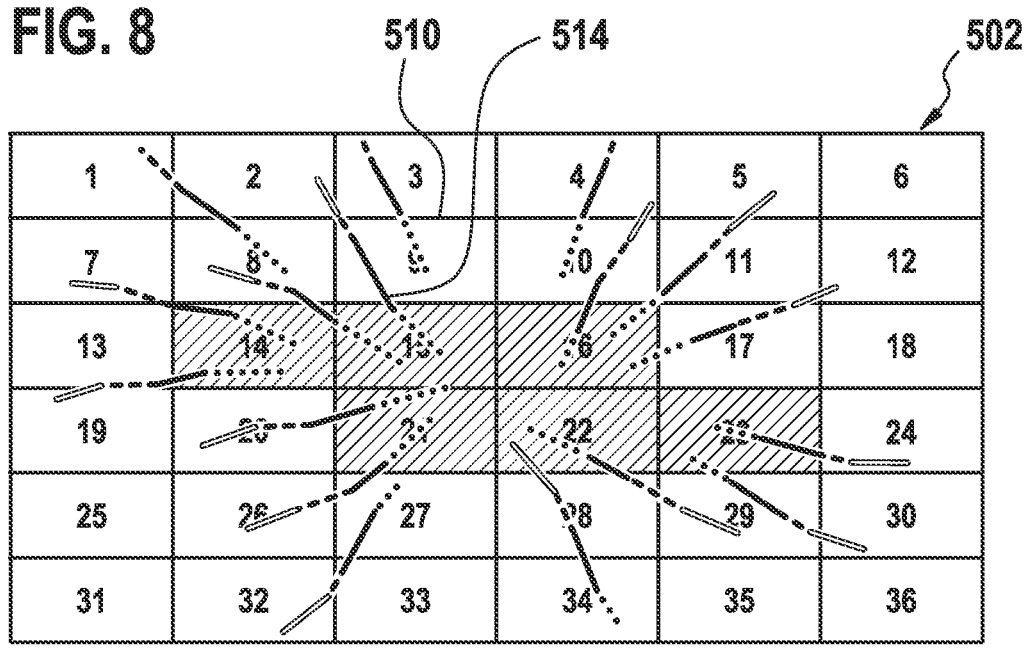
FIG. 8 shows an indexed track map according to one exemplary embodiment of the present invention.

FIG. 8 shows an updated track map 502 according to one exemplary embodiment. This is the track map shown in FIG. 7, which is now provided with indices. Thus, tile 510 denoted by the reference numeral is provided with index "9."

In such an indexed flow track map 502, each tile 510 includes an index, for example an address.

Figures 9, 10:
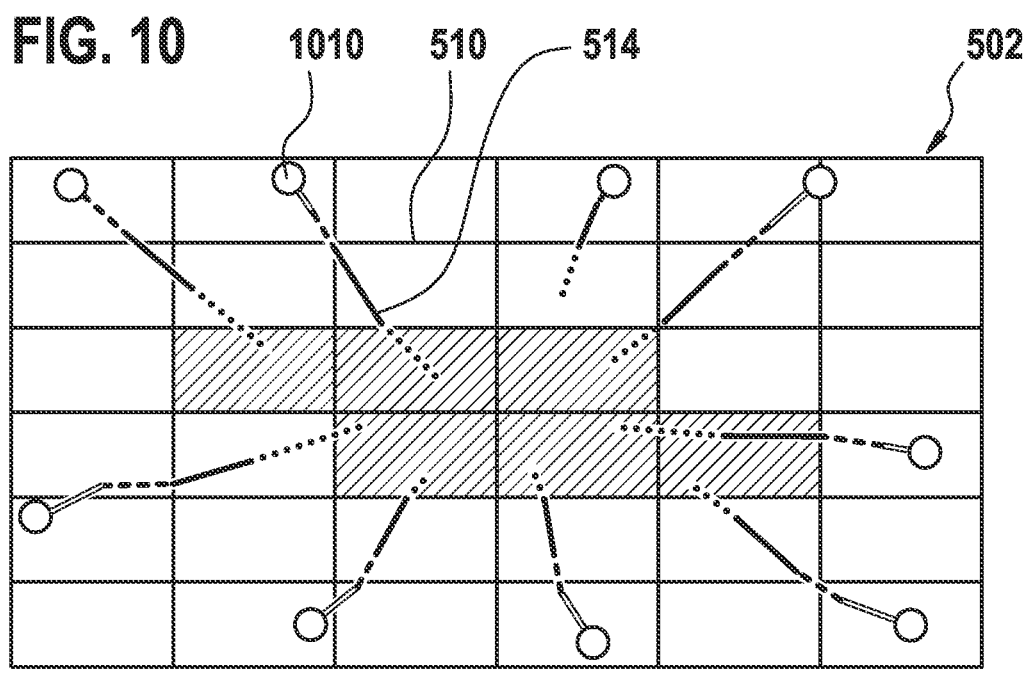
FIG. 9 shows an occupancy map according to one exemplary embodiment of the present invention
FIG. 10 shows a track map according to one exemplary embodiment of the present invention.

FIG. 9 shows an occupancy map 902 according to one exemplary embodiment. Occupancy map 902 is based on the indexed flow track map illustrated in FIG. 8.

The address of the occupying flow track is situated in occupancy map 902. In each case only one address is used in the memory, which is used, for example, for storing a list that maps the flow track map, and multiple entries merely symbolize a collision to be resolved. A null address is used if a tile 510 is not occupied.

The use of occupancy map 902 represents a countermeasure for overcrowding of tiles 510 with flow track end points. After each track expansion, as described with reference to FIG. 5, for example, it is checked whether an address of some other flow track is already present in occupancy map 902 at the end point of the flow track. If this is not the case, the address of the present flow track is stored. For an occupation that is already present, a collision strategy is applied in order to select the better flow track. Such a collision strategy may use, for example, the length of the flow track in pixels, the number of segments (corresponding to the age of the flow track), the magnitude of the quantization error, the origin of the flow track, or other quality criteria of the flow track.

Occupancy map 902 in which the end points are stored may in some cases result in a distinct thinning out of the flow tracks taking place. If the objective is not necessarily a uniform distribution of the end points, but, rather, the avoidance of degenerated configurations for the proper motion estimation, it is more meaningful to store not the end points, but instead the starting point of the last track segment, which corresponds to the second from the last point of the flow track. In contrast to the approach stated above, it is not the multiple occupancy of the end points, but, rather, the multiple occupancy of a tile 510 with starting points of a flow track or of a track segment, that is thus prevented.

A particular feature of the described approach is that occupancy map 902 does not store, for example, the number of occupying flow tracks or other metainformation, but instead stores its address, thus enabling direct access into the memory. A further feature that goes hand in hand with a multi-index concept described below is that no memory- and computation-intensive re-sorting of the flow tracks is necessary for the collision detection.

A further feature is that the collision detection may be switched on and off depending on the situation, and may be activated or deactivated based on the region. For reducing computing time, it may be meaningful to switch on the collision detection only in certain situations. This is the case, for example, when a vehicle including a front camera travels backwards. In other scenarios, collision detection is not necessary. Comparable behavior may be achieved when the collision detection is activated only in one or multiple regions. Here as well, the area around the focus of expansion is suitable.

According to one exemplary embodiment, situations in which a sorting out of flow tracks is desired is indicated using a situation signal. The situation signal is provided, for example, by a control device for controlling an operation of the image detection device. If the situation signal indicates a desired sorting out, for example after or during each extension of a flow track that is carried out, it is checked whether a flow track may be sorted out from the track map. If a flow track to be sorted out is found, it is sorted out from the track map or denoted as invalid or inactive, for example. In contrast, if the situation signal does not indicate a desired sorting out, such a check is not carried out, for example, or a flow track that may possibly be sorted out is not sorted out.

FIG. 10 shows a track map 502 according to one exemplary embodiment. In contrast to the preceding figures, an end point 1010 is marked for each of flow tracks 514. For the sake of clarity, once again only one of tiles 510 is provided with a reference numeral, and only one of the nine illustrated flow tracks and its end point are provided with reference numerals.

Figure 11:
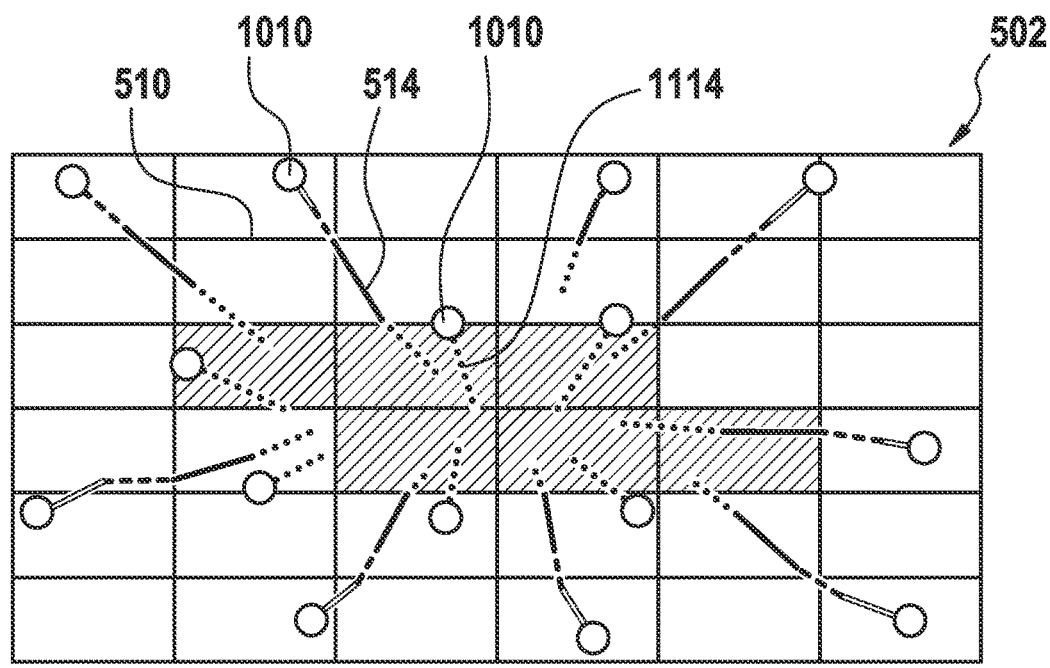
FIG. 11 shows a track map according to one exemplary embodiment of the present invention.

A multi-index concept is described with reference to FIGS. 10 and 11. The multi-index concept represents a further strategy for homogenizing flow track map 502 and in particular the distribution of end points 1010 of flow tracks 514. As illustrated in FIG. 10, end point 1010 of a flow track 514 moves away from its starting point over time, which, however, is actually a desired behavior. However, for many camera orientations this results in regions in the image being "orphaned" fairly quickly. This is necessarily the case in particular in the area of the FOE.

To prevent end points 1010 from thinning out around the FOE, the multi-index concept is utilized in the illustrated approach. It is recognized when a flow track 514 moves away from its origin tile. Upon exceedance of a certain threshold, a new flow track 514 is then started, while previous flow track 514 is continued. This ensures that the distribution of end points 1010 of flow tracks 514 is approximately homogeneous. On the data level, an attribute that describes whether flow track 514 is active or inactive is added to each flow track 514. Alternatively, this state may be queried via the last point in flow track 514 that provides information about the validity of flow track 514.

The number of flow tracks 514 per tile is configurable, and is determined primarily by the requirements of the reduction algorithms and the change in speed of the setting. For the proper motion estimation application, in practice two flow tracks 514 per tile 510 are sufficient. A larger number is desirable for the detection and tracking of objects. It is possible to increase or decrease the number of flow tracks 514 per tile 510 in certain regions of interest during runtime. This could be the case, for example, in the area of the FOE or of the horizontal in order to detect objects that are far away. There are a number of strategies, described below, to determine when a further flow track 514 is started. The least computationally intensive indicator is the number of segments of flow track 514, and thus its age. If two flow tracks 514 collide, the longer flow track is preserved; for the same length, the existing flow track prevails. This results in a reduction in memory accesses.

A further strategy that is possibly better suited algorithmically is to determine the geometric distance between the initial point and end point 1010. A new flow track 514 is started as soon as this distance exceeds a threshold value. The advantage here is that for very small movements, in which flow track 514 does not leave its own tile 510, for example, there is no need for a further flow track 514. In addition, for a flow track 514 that is initially at a distance from the starting point and subsequently comes closer, the geometric distance is well suited as an indicator. Computing time and memory accesses are thus saved. The two stated indicators may also depend on the image region, and may thus have different behaviors locally.

According to one exemplary embodiment, the speed of change of flow track 514 is utilized instead of the geometric distance. If flow track 514 accelerates, i.e., the segments become longer, it may be meaningful to begin a new flow track 514. In this case it is to be expected that the speed of the change increases. A similar approach on the global level is achieved by utilizing vehicle signals. The speed as well as the acceleration are generally provided via the vehicle bus, the same as the change in the orientation of the vehicle (yaw rate, pitch rate, and roll rate). All of these indicators may be utilized to change the threshold at the beginning of new flow tracks 514, large acceleration signals resulting in an earlier beginning of new flow tracks 514. FIG. 11 shows track map 502, described with reference to FIG. 10, after application of the multi-index concept according to one exemplary embodiment. For example, flow track 514 provided with a reference numeral is migrated by the FOE in the direction of the image border. For this flow track 514 a new additional flow track 1114 is started, whose starting point is situated in the same tile 510 in which the starting point of flow track 514 is situated.

The inhomogeneous distribution of end points 1010 apparent in FIG. 10 may be counteracted in the way. For each flow track 514 whose end point 1010 has reached a sufficient distance from its origin tile, a new additional flow track 1114 is started. The distribution of end points 1010 is thus more uniform than before.

As an example, track map 502 has been supplemented by six additional flow tracks 1114, each of which includes an end point 1010 that is situated near the FOE.

Figure 12:
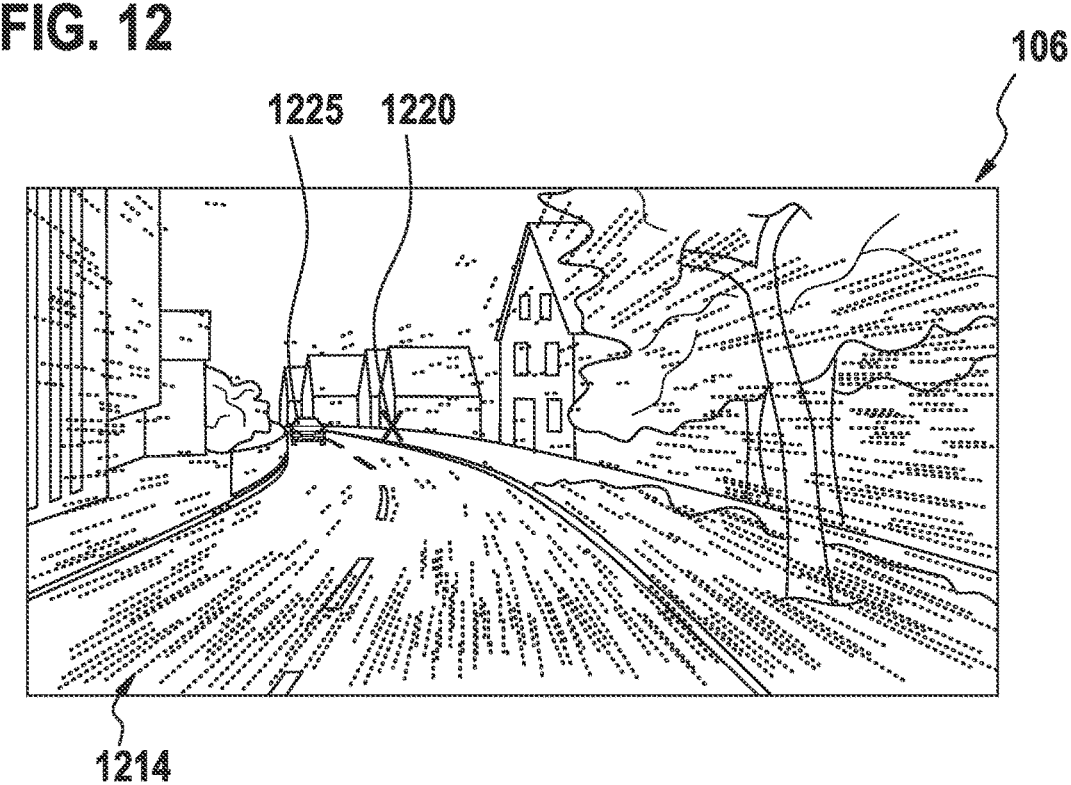
FIG. 12 shows an image including new flow tracks according to one exemplary embodiment of the present invention.

FIG. 12 shows an image 106 including new flow tracks 1214 according to one exemplary embodiment that are determined using this image 106. In addition, an "X" is depicted which represents focus of expansion (FOE) 1220. New flow tracks 1214 may be entered into a track map as described above.

A possible limitation of the start region for new flow tracks 1214 is described with reference to FIG. 12.

FIG. 12 illustrates new flow tracks 1214 that are reinitialized in a single pass, for example during the update of a track map described with reference to FIG. 5. According to one exemplary embodiment, such a reinitialization takes place when the previous flow track of the tile does not find a successor or was deleted in the collision detection. It is apparent from image 106 that primarily vectors at the image border have been reinitialized, in particular in the regions that are far away from FOE 1220. In addition, it is apparent that the vectors in the next image, i.e., new flow tracks 1214 that are supplemented by the flow vectors resulting from the next image, will no longer be situated in the image plane. Their long-term benefit is thus limited while the computing and memory access time is great.

To solve this problem, according to one exemplary embodiment, a region-based limited starting of tracks is carried out in order to increase the computing efficiency. As background for this feature, knowledge about the number of memory accesses is crucial for selecting a starting point. If no active or valid flow track exists in a tile, a suitable starting point for a new flow track 1214 must be found. In the most favorable case, these starting points are provided externally. If this is not possible, according to one exemplary embodiment all possible starting points of a tile are examined for suitability. In the normal case, this means not only a long computing time but also increased effort for access to the (potentially slow) working memory.

To reduce these efforts, according to one exemplary embodiment a region-based activation of starting points is carried out. The particular tiles in which new flow tracks 1214 are allowed to be started may be established by parameterization. This is generally not meaningful in all regions of image 106. For a front camera during forward travel, initializing new flow tracks 1214 at the image border brings little added value, since in the near future these new flow tracks 1214 will migrate out of the image area or will be overwritten by longer tracks within the scope of the collision detection. For a laterally oriented fisheye camera, the flow vectors in the middle of the left or right image border are compressed. Here as well, according to one exemplary embodiment this area is omitted in order to reduce the computing and memory load.

According to one exemplary embodiment, an enabling signal is generated that indicates in which tiles new flow tracks 1214 are allowed to be started. The enabling signal is generated, for example, as a function of an operating mode of the image detection device which has detected image 106. Alternatively, an appropriate enabling signal is predetermined. By use of the enabling signal, for each pass it may be ascertained whether or not a new flow track 1214 is allowed to be started in a tile.

Another approach is the limitation of the start region to objects in image 106. These objects are externally predefined, for example by shape-based object detection or semantic segmentation. In this case, new flow tracks 1214 are limited to the predefined objects, and are suitable for tracking. For example, a vehicle that is mapped in image 106 may be used as such an object 1225.

According to one exemplary embodiment, an object signal is generated that indicates in which tiles object 1225 is situated. The object signal is provided by an object recognition device, for example, which is designed to recognize relevant object 1225 in image 106 and to indicate a position of same within image 106. By use of the object signal, for each pass it may be ascertained whether a tile covers an area of image 106 that is relevant, for example, for tracking object 1225. If this is the case, the starting of a new flow track 1214 for this tile may be enabled. Otherwise, this tile may be blocked for the restarting of tracks.

Figure 13:
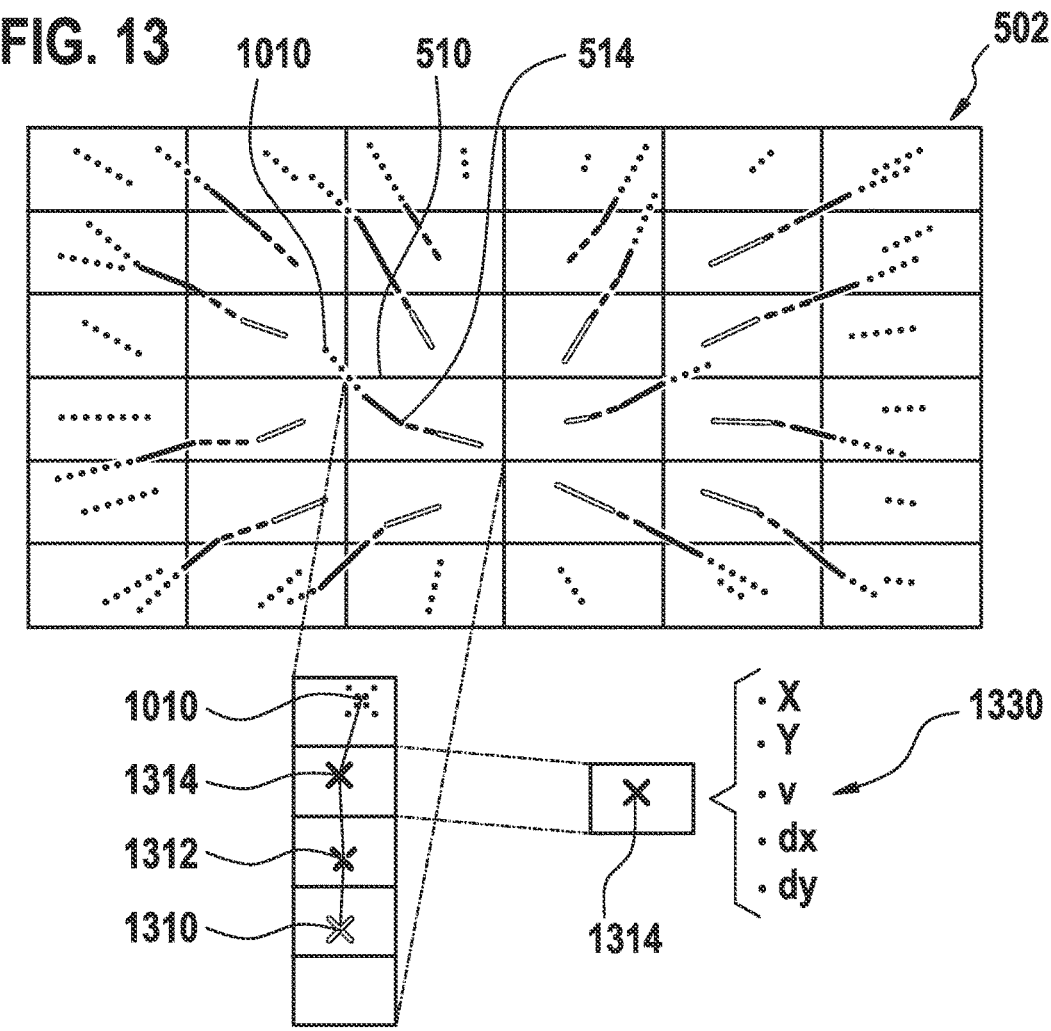
FIG. 13 shows a schematic illustration of a data layout of a track map according to one exemplary embodiment of the present invention.

FIG. 13 shows a schematic illustration of a data layout 1330 of a track map 502 according to one exemplary embodiment. As an example, a starting point 1310, a first intermediate point 1312, a second intermediate point 1314, and an end point 1010 are illustrated for a flow track 514 of track map 501. Flow track 514 extends between starting point 1310 and end point 1010. Flow track 514 is made up of a first flow vector that extends between starting point 1310 and first intermediate point 1312, a second flow vector that extends between first intermediate point 1312 and second intermediate point 1314, and a third flow vector that extends between second intermediate point 1314 and end point 1010.

x and y coordinates, a piece of validity information "v," and a quantization error dx and dy made during concatenation exist for each point 1310, 1312, 1314, 1010. For the sake of clarity, only one flow track 514 per tile 510 is illustrated, once again only one tile and one flow track being provided with reference numerals. The concept involves M flow tracks 514 per tile 510 in order to achieve a uniform distribution of end points 1010 of flow tracks 514, as is achievable, for example, by the described multi-index concept.

FIG. 13 shows the structural design of an individual flow track 514 by way of example. It is apparent that a track is made up not only of starting point 1310 and end point 1010, but also the particular individual points (x and y), a validity attribute, and quantization error dx and dy. It is thus made possible, starting from the last image or image point, for an arbitrarily long or short distance of flow track 514 to be reconstructed. This is particularly important in practice, since in this case the present image is always the reference variable. If the present image is denoted as T, in practical application a proper motion estimation, a depth reconstruction of the setting, and an object detection between image T and T-X are necessary. X may be selected as X=1 . . . m, where m is a variable integer and m<M−1, where M is the maximum number of points 1010, 1310, 1312, 1314 stored in a flow track 514.

By use of the data layout presented here, various m's may be implemented although only one track map 502 is present. An estimation of the proper motion across multiple temporal or spatial distances as well as the reconstruction of the depth of the setting across multiple temporal distances are thus made possible. In practice, various temporal distances are utilized in order to recognize different types of objects in the setting.

For fast-moving objects such as crossing cyclists or oncoming vehicles, a short time basis is advisable, since the object is visible only briefly in the image, or cannot be precisely recognized over extended time periods due to limitations of the optical flow, as explained below with reference to FIG. 15. On the other hand, a long time basis is advantageous for objects that are far away or that are moving slowly. These may be, for example, preceding vehicles or vehicles at the end of a traffic jam. Both applications may be handled at the same time using the data concept shown here.

Figure 14:
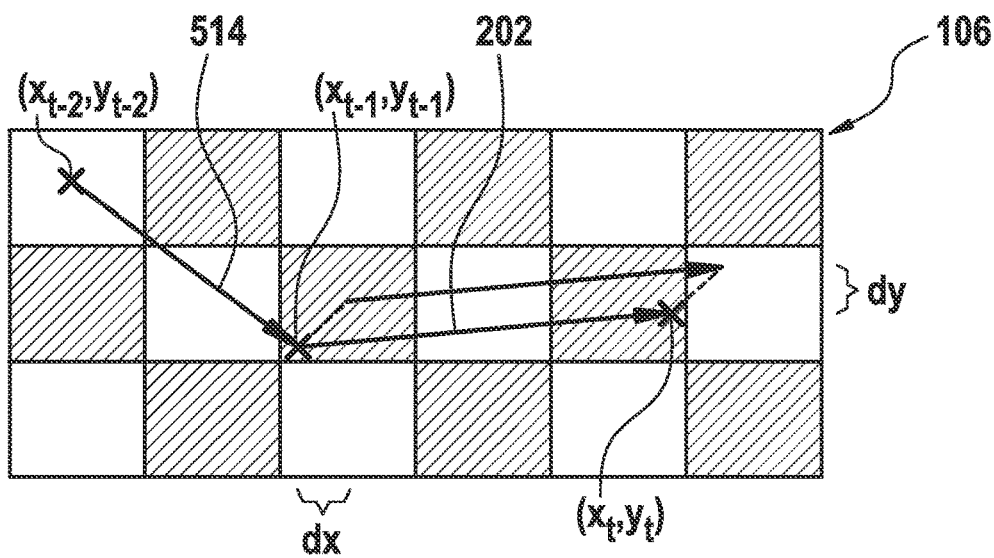
FIG. 14 shows an image including a flow track to be extended according to one exemplary embodiment of the present invention.

FIG. 14 shows an image 106 including a flow track 514 to be extended according to one exemplary embodiment. Flow track 514 is extended using a present flow vector 202, resulting in a quantization error dx, dy. The quantization error results when a flow vector, which in the present case corresponds to flow track 514, ends on a noninteger value. To read out the next flow vector, flow vector 202 in the present case, the end point must be rounded to the next integer pixel, resulting in the quantization error. Minimization of the quantization error is advantageous.

It is apparent from FIG. 13 that each point in flow track 514 also contains pieces of information concerning the quantization error (dx and dy). This results when a flow track 514 ends on a noninteger pixel, as is common for flow algorithms with subpixel estimation. If flow track 514 is to be extended, rounding from the end of flow track 514 to the next integer pixel must take place as shown in FIG. 14, resulting in a quantization error.

Under the assumption that a subpixel estimation is always present in the optical flow, the subpixel may be limited to ±1 px by subtracting the quantization error during the concatenation of flow vectors 202 from the last point of flow track 514. Initially the indices for access into the flow map, denoted by $x_{idx}$ and $y_{idx}$, are computed. The quantization error of the last pass is subtracted from the end point of the last pass:

$$x_{idx} = \text{round}(x_{t-1} - dx_{t-1})$$

$$y_{idx} = \text{round}(y_{t-1} - dy_{t-1})$$

For the concatenation of the flow vectors, in the present case for the concatenation of flow track 514 with flow vector 202, optical flow (OF (x, y)) is now queried at the location of the previously computed rounded coordinates, and is added component-by-component to last point $(x_{t-1}, y_{t-1})$:

$$(x_t, y_t) = (x_{t-1}, y_{t-1}) + OF_{t-1,t}(x_{idx}, y_{idx})$$

The new quantization error is now determined, as shown in the following equations, by subtracting the rounded index for x or y of the previous end point from the true value:

$$d_{xt} = \text{round}(x_{t-1} - dx_{t-1}) - (x_{t-1} - dx_{t-1})$$

$$d_{yt} = \text{round}(y_{t-1} - dy_{t-1}) - (y_{t-1} - dy_{t-1})$$

It is thus ensured that the quantization error does not accumulate over an extended period of time in only the positive direction or only the negative direction, or does not exceed a value of ±1 px.

An alternative to the procedure is the interpolation of a neighborhood of flow vectors. The determination of the next track segment considered thus far corresponds to a nearest neighbor interpolation. For some interpolation, for example a bilinear interpolation, a rounding error, not a quantization error, results. However, the computation time is many times longer and is associated with more accesses to the slow working memory, since the data are situated in the memory distributed over multiple image lines. A cache-friendly access is not possible. In addition, it is not ensured that the results via an interpolation are actually more accurate.

Figure 15:
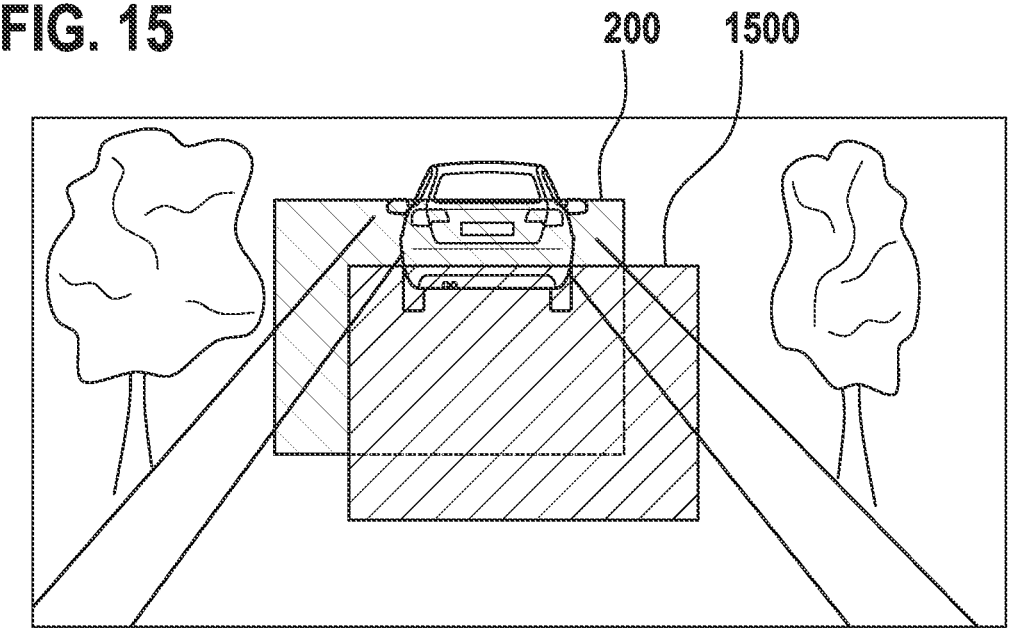
FIG. 15 shows flow maps according to one exemplary embodiment of the present invention.
Figure 16:
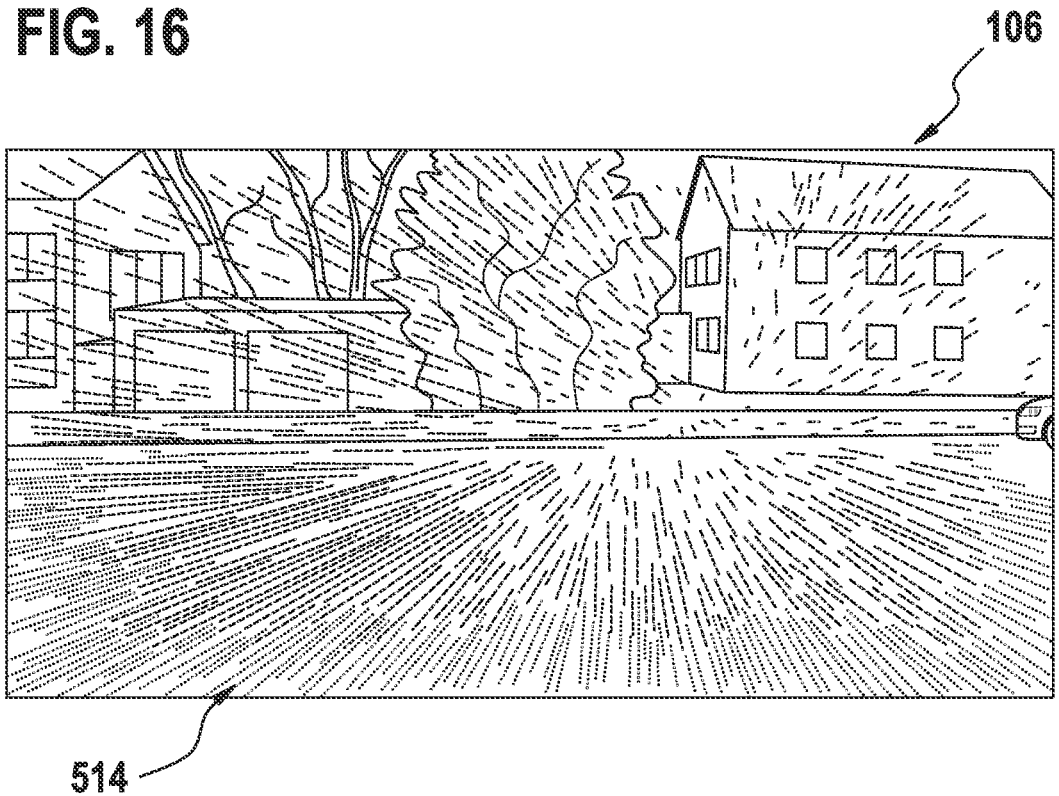
FIGS. 16 through 19 show images including flow tracks according to one exemplary embodiment of the present invention.
Figure 17:
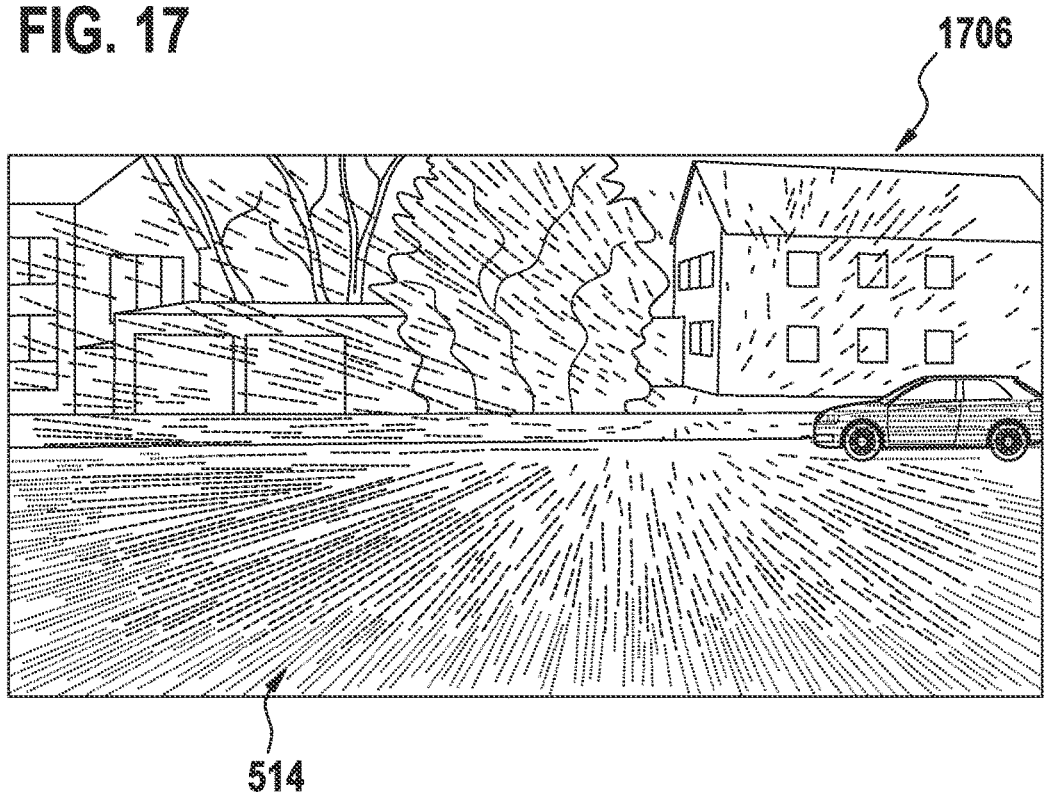
Figure 18:
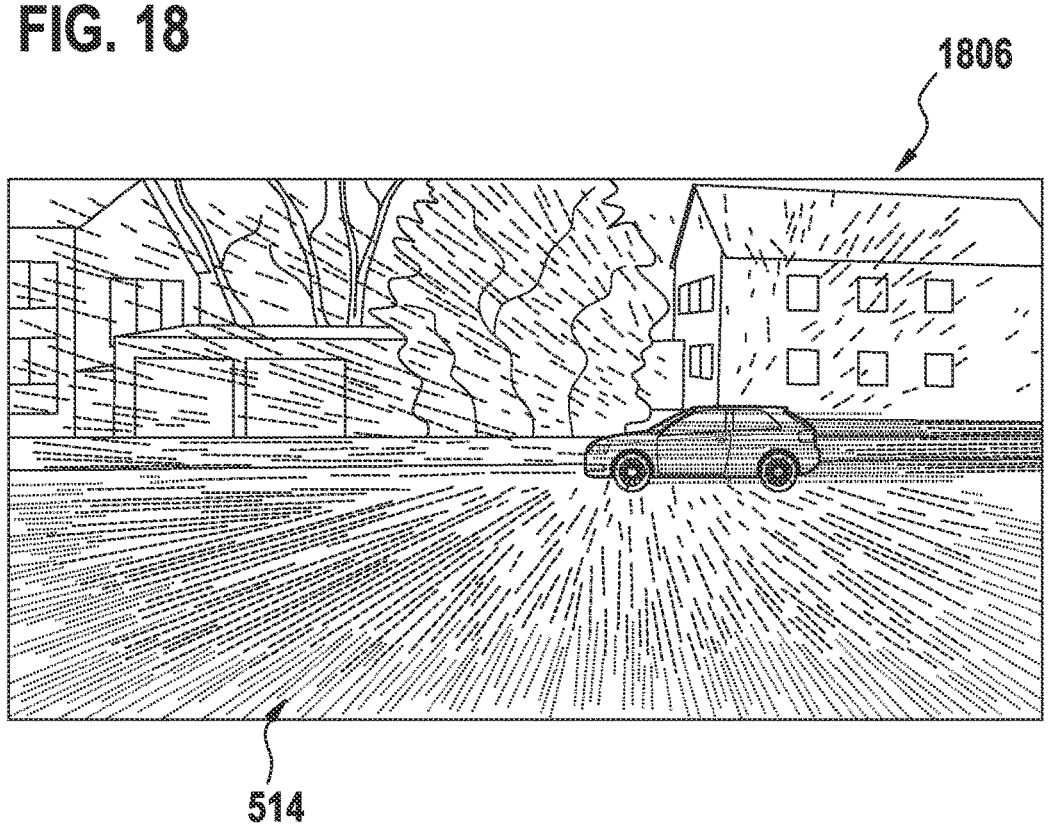
Figure 19:
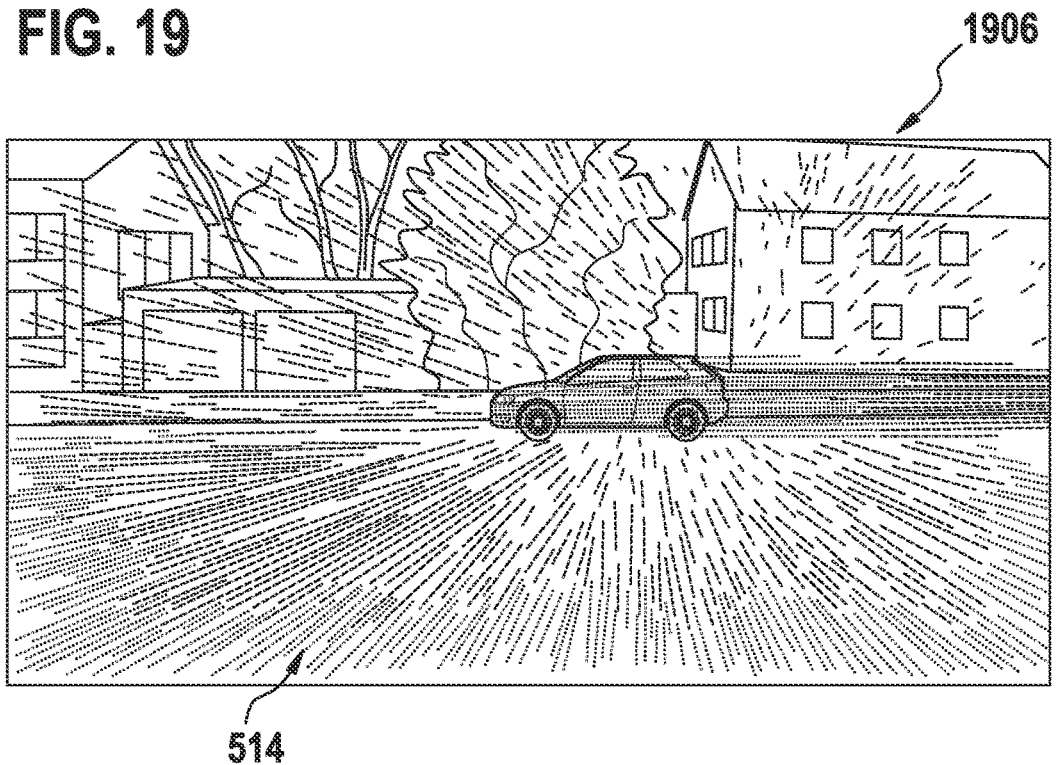

FIG. 15 shows flow maps 200, 1500 according to one exemplary embodiment. A flow map 200 from the present pass and a flow map 1500 from the previous pass are illustrated. Flow maps 200, 1500 may have a spatial offset, as schematically illustrated in FIG. 15.

In systems that move freely in the world, not all regions of an image have the same relevance. For this reason, it is advisable to spatially limit the resource-intensive computation of the optical flow, as illustrated via flow maps 200, 1500 in FIG. 15. In many cases it is meaningful for the region of the optical flow to follow a certain location in the image or to be limited to a certain region. This may be an object or the focus of expansion, for example. In contrast, the sky, for example, is usually of lesser relevance. To achieve this, according to one exemplary embodiment a spatial offset of the flow fields is compensated for. The actual dimensions of the flow track map are established separately.

FIGS. 16 through 19 show images 106, 1706, 1806, 1906 including flow tracks 514 according to one exemplary embodiment. Flow tracks 514 with characteristic encoding of the individual flow vectors are illustrated. Each characteristic represents a flow vector from an individual time increment between two images 106, 1706, 1806, 1906. For example, a dotted-line segment represents a new flow vector, and a dashed-line flow vector represents an old flow vector. Also illustrated are flow tracks 514 of the static world, which are used for the proper motion estimation, as well as flow tracks 514 on a moving vehicle for use in the object recognition.

Figure 20:
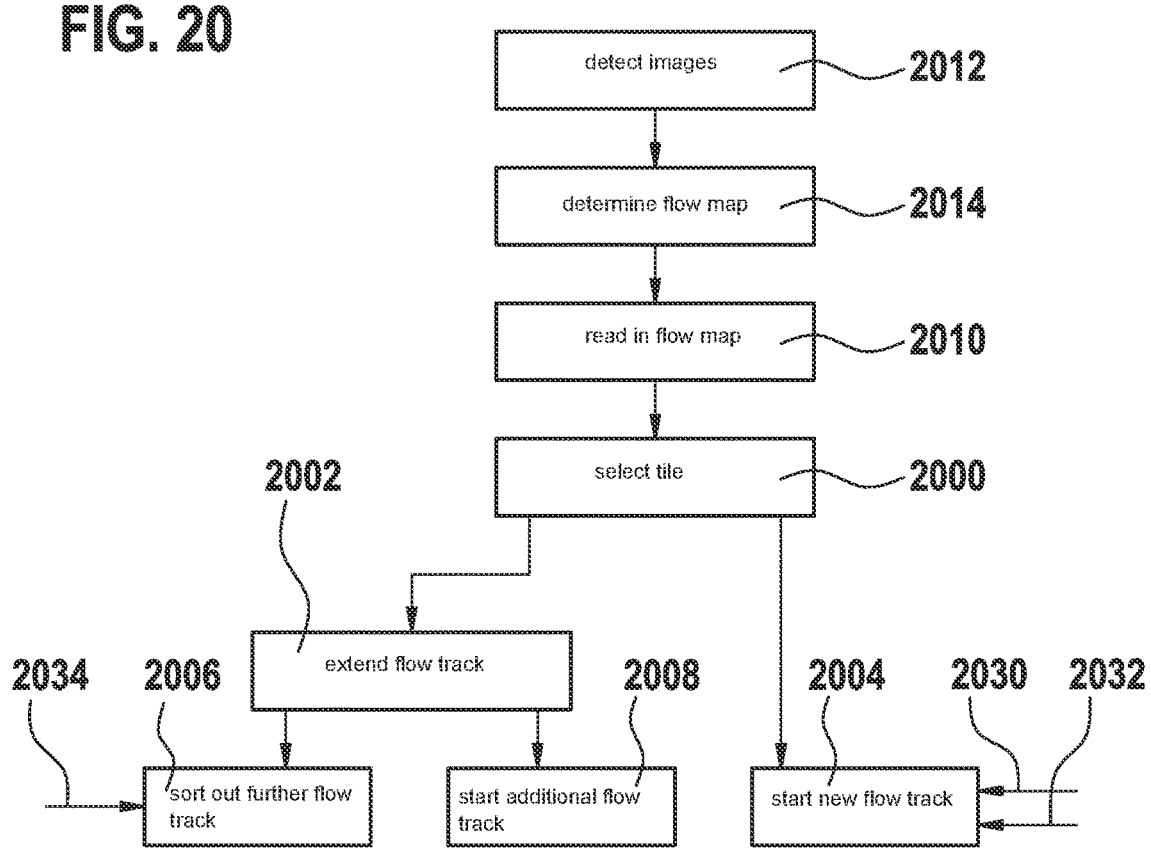
FIG. 20 shows a flowchart of a method according to one exemplary embodiment of the present invention.

FIG. 20 shows a flowchart of a method for linking optical flow across a plurality of images. For this purpose, flow vectors may be determined, for example, from a series of images in chronological succession and aligned in a row to form flow tracks. For example, this is an exemplary embodiment of a method as previously described with reference to the preceding figures.

At least one tile is selected from a track map in a step 2000. A corresponding track map including a plurality of tiles and flow tracks is shown in FIG. 8, for example. At least one flow track that is associated with the selected tile is extended in a step 2002. The flow track is extended using a flow vector of a flow map, as shown in FIG. 2, for example. According to one exemplary embodiment, steps 2000, 2002 are carried out repeatedly for all tiles or for selected tiles of the track map.

If a track map is not yet available, according to one exemplary embodiment all flow vectors or a selection of flow vectors of a flow map are/is used as initial flow tracks.

An end point of the flow track prior to the extension is optionally retained in step 2002 as an intermediate point of the flow track. Additionally or alternatively, a validity attribute of the flow track which indicates a validity of the flow track is set. Additionally or alternatively, a quantization error of the flow track is updated. According to one exemplary embodiment, in the step of extending, the end point of the flow track after the extension is corrected by a quantization error associated with the flow track.

According to one exemplary embodiment, the flow track is extended in step 2002 when an end point of the flow track is associatable with a starting point of a flow vector. If this is not the case, according to one exemplary embodiment instead of step 2002, a step 2004 is carried out in which a new flow track is started, using a flow vector of the flow map. According to one exemplary embodiment, step 2004 is also carried out for the case that no flow track is associated with the tile.

According to one exemplary embodiment, the new flow track is started, using a starting point in the tile, in step 2004 when an enabling signal 2030 indicates an enablement of the tile for starting new flow tracks, or an object signal 2032 indicates a mapping of a relevant object in an image detail of the present image associated with the tile, by use of which a flow vector has been determined that is used as a new flow track. Enabling signal 2030, and additionally or alternatively object signal 2032, are provided by an image evaluation device, for example.

Either the flow track that is extended in step 2002 or a further flow track from the track map is optionally sorted out in a step 2006. The sorting out takes place when the end point of the extended flow track is occupied by an end point of the further flow track. To determine which of the flow tracks are sorted out, for example a comparison between quality criteria associated with the flow tracks is carried out, and the selection of the flow track to be sorted out takes place based on a result of the comparison. According to one exemplary embodiment, the step of sorting out is carried out as a function of a situation signal 2034 or is skipped. Situation signal 2034 is provided, for example, by a control device for controlling an operation of an image detection device for detecting the images. For example, situation signal 2034 is provided as a function of an operating mode of the image detection device.

An additional flow track is optionally started in a step 2008 when the flow track fulfills a restart criterion after step 2002 of extending.

The method optionally includes a step 2010 in which the flow map is read in. The method also optionally includes a step 2012 in which images are detected, and additionally or alternatively, a step 2014 in which the flow map is determined at least using one of the detected images.

According to one exemplary embodiment, the method is carried out in real time. In this way, an updated track map may be determined, for example, in response to each newly detected image.

What is claimed is:

1. A method for linking optical flow across a plurality of images of an image detection device for a vehicle, the method comprising the following steps:
   selecting at least one tile from a track map, the track map including a plurality of flow tracks and being subdivided into a plurality of tiles; and
   extending at least one flow track of the flow tracks encompassed by the tile, using a flow vector of a flow map that is associatable with the flow track, the flow map including a plurality of flow vectors that are based on a present image of the plurality of images, wherein in the step of extending, a quantization error of the flow track is updated, wherein the quantization error indicates a deviation between a quantified end point of the flow track and an actual end point of the flow track.

2. The method as recited in claim 1, wherein in the step of extending, the flow track is extended when the actual end point of the flow track is associatable with a starting point of the flow vector.

3. The method as recited in claim 1, further comprising:
   starting a new flow track, using a flow vector of the flow map, when the tile encompasses no flow track with which the flow vector of the flow map is associatable.

4. The method as recited in claim 3, wherein in the step of starting, the new flow track is started, using a starting point in the tile, when an enabling signal indicates an enablement of the tile for starting new flow tracks, or an object signal indicates a mapping of a relevant object in an image detail of the present image associated with the tile.

5. The method as recited in claim 1, further comprising:
   a sorting out step, in which either the flow track or a further flow track is sorted out from the track map when the actual end point of the flow track is occupied after the extension from an actual end point of the further flow track.

6. The method as recited in claim 5, wherein in the sorting out step, the flow track or the further flow track is selected for sorting out based on a comparison between a quality criterion of the flow track and a quality criterion of the further flow track.

7. The method as recited in claim 5, wherein the sorting out step is carried out as a function of a situation signal or is skipped.

8. The method as recited in claim 1, further comprising:
a restarting step, in which an additional flow track is started when the flow track fulfills a restart criterion after the extension.

9. The method as recited in claim 1, wherein in the step of extending, the actual end point of the flow track prior to the extension is retained as an intermediate point of the flow track.

10. The method as recited in claim 1, wherein in the step of extending, the actual end point of the flow track after the extension is corrected by a quantization error associated with the flow track.

11. The method as recited in claim 1, further comprising:
reading in the flow map, using the flow vectors based on the present image of the plurality of images, at least the steps of selecting and extending being carried out for the at least one tile of the track map in response to the reading in of the flow map.

12. The method as recited in claim 1, wherein the method is carried out in real time.

13. The method as recited in claim 1, further comprising:
detecting the present image of the plurality of images, using the image detection device, and/or forming the flow map using the present image.

14. A device configured for linking optical flow across a plurality of images of an image detection device for a vehicle, the device configured to:
select at least one tile from a track map, the track map including a plurality of flow tracks and being subdivided into a plurality of tiles; and
extend at least one flow track of the flow tracks encompassed by the tile, using a flow vector of a flow map that is associatable with the flow track, the flow map including a plurality of flow vectors that are based on a present image of the plurality of images, wherein in the step of extending, a quantization error of the flow track is updated, wherein the quantization error indicates a deviation between a quantified end point of the flow track and an actual end point of the flow track.

15. A non-transitory computer-readable storage medium on which is stored a computer program for linking optical flow across a plurality of images of an image detection device for a vehicle, the computer program, when executed by a computer, causing the computer to perform the following steps:
selecting at least one tile from a track map, the track map including a plurality of flow tracks and being subdivided into a plurality of tiles; and
extending at least one flow track of the flow tracks encompassed by the tile, using a flow vector of a flow map that is associatable with the flow track, the flow map including a plurality of flow vectors that are based on a present image of the plurality of images, wherein in the step of extending, a quantization error of the flow track is updated, wherein the quantization error indicates a deviation between a quantified end point of the flow track and an actual end point of the flow track.

* * * * *